No. 684,942. Patented Oct. 22, 1901.
J. B. MERCER.
BOOK CUTTING OR TRIMMING MACHINE.
(Application filed Apr. 22, 1901.)

(No Model.) 3 Sheets—Sheet 1.

WITNESSES
W. R. Berry
Jno. B. Dloeg

INVENTOR:
John Bernard Mercer
by Henry H. Bates
Attorney.

No. 684,942. Patented Oct. 22, 1901.
J. B. MERCER.
BOOK CUTTING OR TRIMMING MACHINE.
(Application filed Apr. 22, 1901.)
(No Model.) 3 Sheets—Sheet 2.

No. 684,942. Patented Oct. 22, 1901.
J. B. MERCER.
BOOK CUTTING OR TRIMMING MACHINE.
(Application filed Apr. 22, 1901.)
(No Model.) 3 Sheets—Sheet 3.

WITNESSES
INVENTOR.
John Bernard Mercer
by Henry H. Bates,
Attorney.

UNITED STATES PATENT OFFICE.

JOHN BERNARD MERCER, OF LONDON, ENGLAND.

BOOK CUTTING OR TRIMMING MACHINE.

SPECIFICATION forming part of Letters Patent No. 684,942, dated October 22, 1901.

Application filed April 22, 1901. Serial No. 56,972. (No model.)

*To all whom it may concern:*

Be it known that I, JOHN BERNARD MERCER, bookbinder, a subject of the King of Great Britain, residing at 37 Kirby street, London, in the county of Middlesex, England, have invented new and useful Improvements in Book Cutting or Trimming Machines, (for which I have made application for British Patent No. 21,109, dated November 22, 1900,) of which the following is a specification.

This invention relates to an improved construction of book cutting or trimming machine in which the books to be operated upon are carried and held between two traveling bands and submitted to the action of either a circular revolving or a straight stationary cutter; but in order that my invention may be fully understood I will proceed to describe same by the aid of the accompanying drawings, in which—

Figure 1:
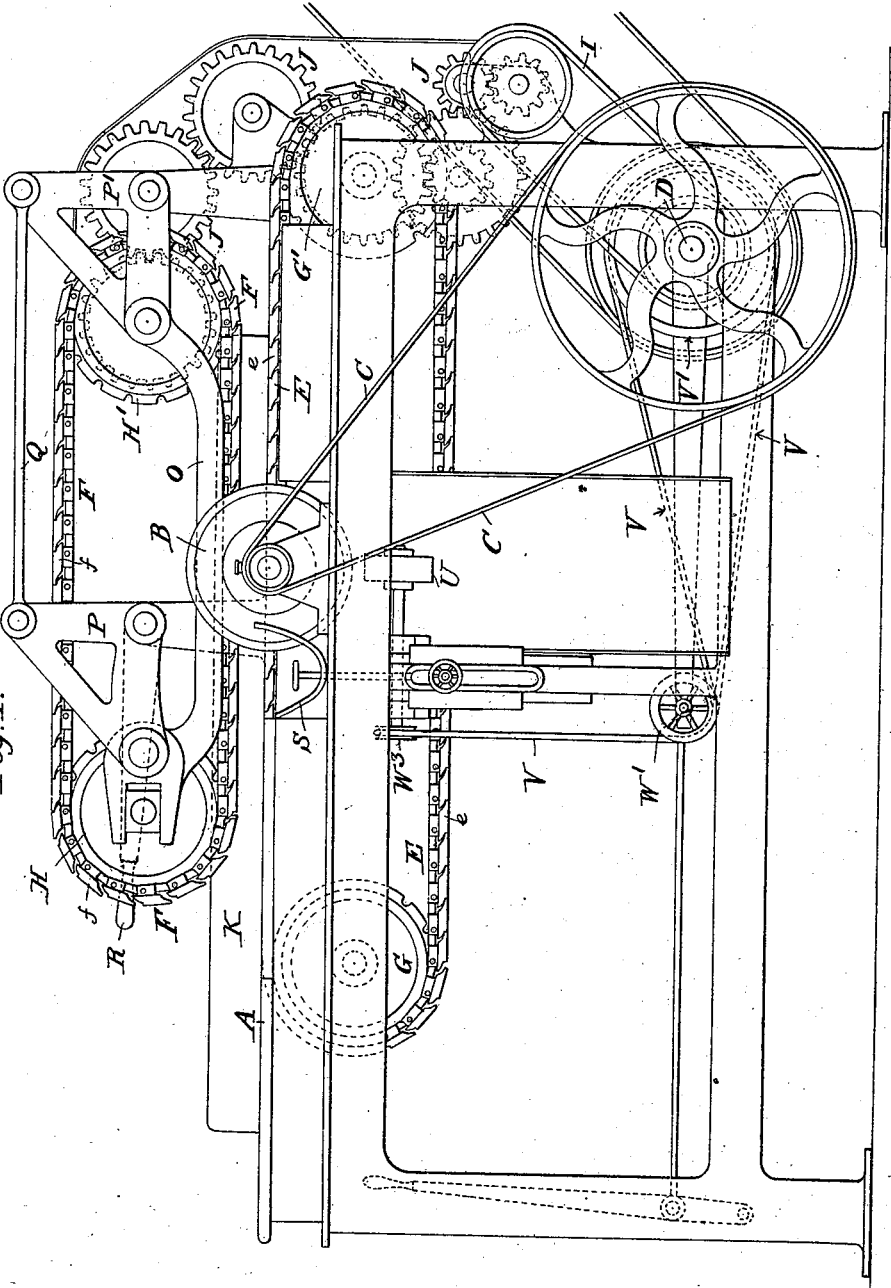
Figure 2:
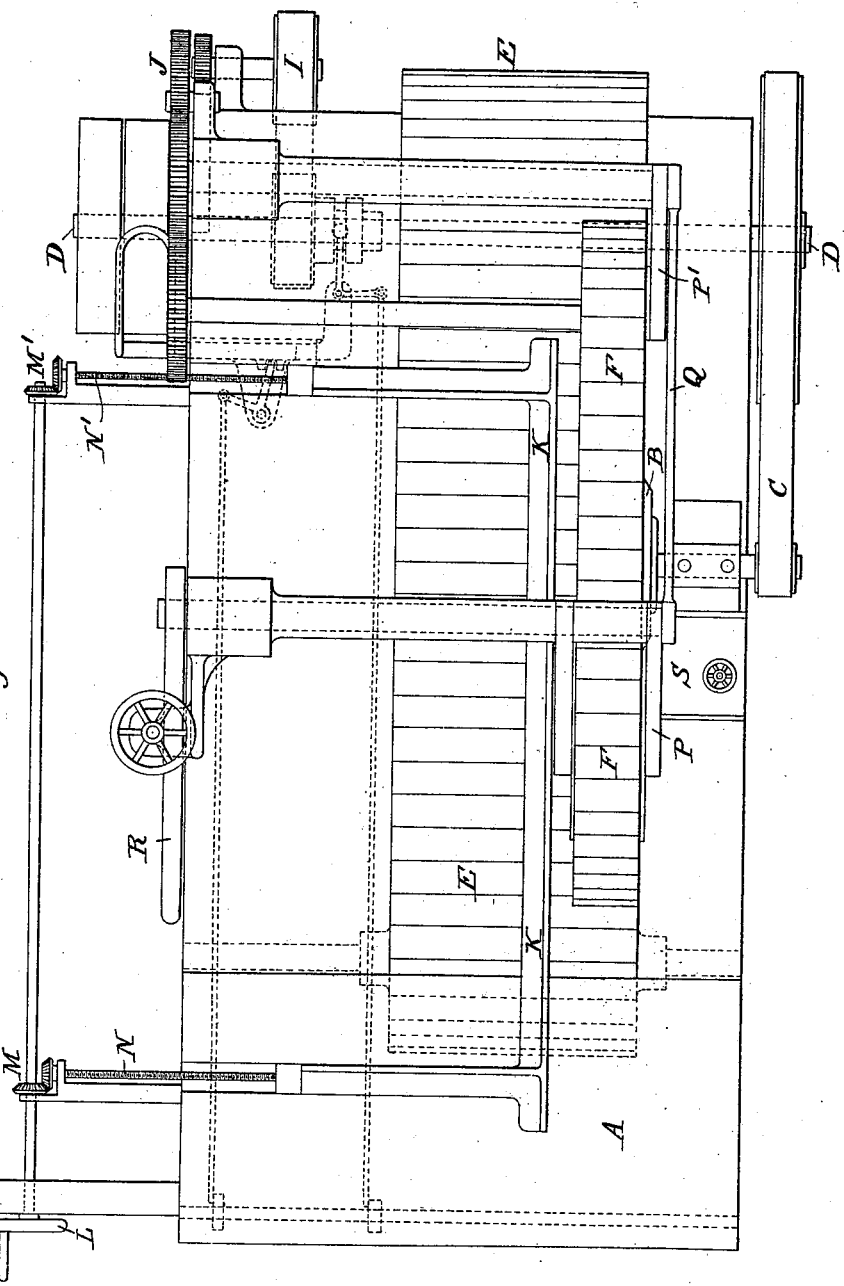

Figure 1 is a side elevation of the machine; Fig. 2, a plan view thereof, and Fig. 3 an end elevation of same. Fig. 4 is a side elevation of part of the carrying-chains and illustrates the application of a stationary straight cutter in place of the rotary circular cutter employed in the machine illustrated in Figs. 1, 2, and 3.

Figure 3:
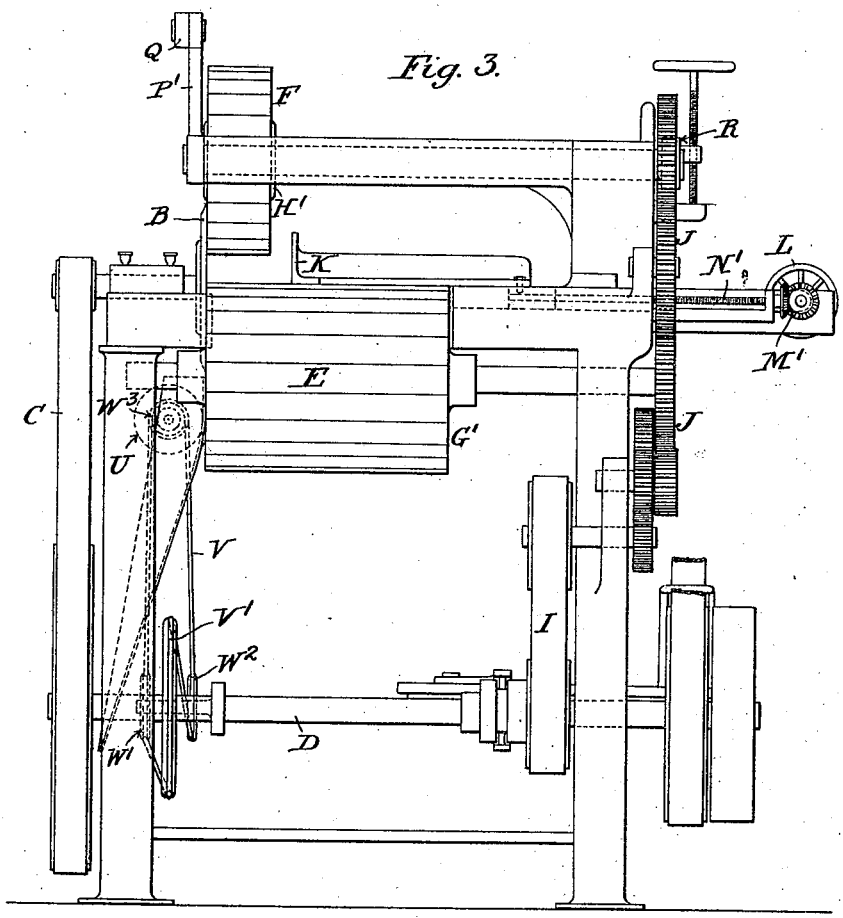
Figure 4:
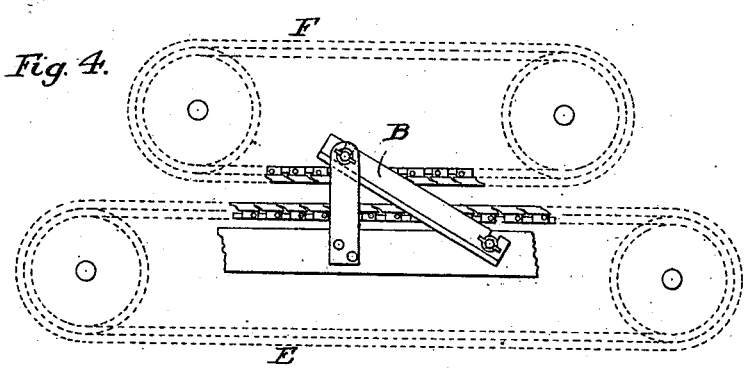

Referring to Figs. 1, 2, and 3, it will be seen that upon a suitable framework a table A is provided, upon which the books to be cut or trimmed are placed and from which they are fed by the operator into the machine. At a suitable distance from this table and approximately level therewith a circular cutting-disk B is mounted upon the frame, said disk being approximately in the form of an ordinary circular saw, but having a cutting knife-edge in place of teeth and being actuated by a belt C from the driving-shaft D. One side of the disk B is flat.

For the purpose of causing the books to travel across the flat face of the disk B two horizontal endless belt-chains E and F are provided, the same passing over carrying-wheels G G' and H H', respectively, and actuated from the driving-shaft D by a belt I and a train of gear-wheels J, so as to both run uniformly at the same speed.

The books as they are taken in succession by the operator from the table A and placed on the lower belt E are carried forward by the latter between it and the upper belt F, between which they are firmly held as they are carried past the revolving cutter B, the projecting edges to be cut or trimmed being submitted to the action thereof in their passage. A trough or channel S is arranged in advance of the cutting-disk B, and into it fall the cuttings or trimmings removed from the edges of the books, so passing out clear of the machine.

The chains may be made of metal and composed of a series of bars or slats $e$ and $f$, articulated together, rollers being provided to engage the recesses in the carrying-wheels G G' and H H'. The operating surfaces of the two chains E and F are level and parallel to each other and they are driven at equal speeds, carrying the books between them. The edges of the chains are also true and parallel, and the chains are guided both laterally and vertically in their frames in a straight line past the cutting-disk, the face of which their edges almost touch. A back gage or guide K is provided, and its position in relation to the cutting-disk B can be adjusted by means of the hand-wheel L, bevel-wheels M M', and screws N N', so as to suit books of different widths.

To enable the machine to operate on books of different thicknesses, the upper chain-carrying wheels H H' can be raised or lowered, so as to vary the distance between the opposed surfaces of the upper and lower chains to suit the particular book to be operated upon at the time. For this purpose the bearings of said wheels H H' are connected together by bar O, and this is at its opposite ends pivoted to one arm of two two-armed or bell-crank levers P P', which in turn are pivoted to the frame of the machine. The upper ends of the other arms of the levers P P' are also connected together by a rod Q. The spindle or pivot of the lever P is fitted with a lever R, by raising or lowering which the wheels H H' and the chain F they carry will also be lowered toward or raised away from the lower chain E, and the distance between the opposed surfaces of the chains thus be varied to suit requirements.

An emery or other grinding wheel U is provided and driven from the main shaft D by means of an endless belt or cord V, passing over the pulley V' and also around other grooved pulleys $W'$ $W^2$ $W^3$, the latter situated on the spindle of the emery-wheel U. The bearings of the spindle of such wheel are mounted so that the latter can be moved both vertically and horizontally in order to bring it against the cutting edge of disk B when required to sharpen the same and to permit this to be effected in spite of any reduction in diameter of the cutting-disk owing to wear.

In the arrangement shown in Fig. 4 the circular revolving cutting-disk B is replaced by a straight stationary cutter suitably clamped or secured to the frame of the machine in the proper position in relation to the chains E and F, between which the books to be operated upon are carried and held.

What I claim as my invention, and desire to secure by Letters Patent, is—

1. In combination, two endless traveling belts arranged one above the other, between which the material to be trimmed is held and carried, means for adjusting the distance between the belts, and at the side thereof, in the line of travel of the edges of said material, a cutting means, with mechanism for operating the same, whereby the said material is trimmed but not severed as it is carried past the cutter, substantially as specified.

2. In combination, two endless traveling belts arranged one above the other, between which the material to be trimmed is held and carried, means for adjusting the distance between the belts, and at the side thereof, in the line of travel of the edges of said material, a revolving cutting-disk, with mechanism for operating the same, whereby the said material is trimmed but not severed as it is carried past the said revolving cutting-disk.

3. In combination, two endless traveling belts arranged one above the other, between which the material to be trimmed is held and carried, and at the side thereof, in the line of travel of the edges of said material, a cutting means, with mechanism for operating the same, whereby the said material is trimmed but not severed as it is carried past the cutter, the wheel-bearings of the upper traveling belt being sustained in pivoted bell-crank-lever arms, the free arms of said lever-supports on each side of the traveling belt being linked together to move in unison and preserve parallelism in the different positions of the moving belt, substantially as specified.

4. The combination of two endless traveling belts between which the books to be cut or trimmed are carried and held, a cutting-knife situated in the line of travel of the edges of said books, and a revolving emery or other grinding wheel capable of being raised into contact with the cutting-knife, substantially as specified.

In testimony whereof I have signed my name to this specification in the presence of two subscribing witnesses.

JOHN BERNARD MERCER.

Witnesses:
HARRY A. McLELLAN,
WALTER J. SKERTEN.